United States Patent
McDonnell et al.

(10) Patent No.: US 12,051,002 B2
(45) Date of Patent: Jul. 30, 2024

(54) AUTOMATED MODEL BUILDING SEARCH SPACE REDUCTION

(71) Applicant: SparkCognition, Inc., Austin, TX (US)

(72) Inventors: Tyler S. McDonnell, Austin, TX (US);
Sari Andoni, Austin, TX (US);
Junhwan Choi, Austin, TX (US);
Jimmie Goode, Austin, TX (US);
Yiyun Lan, Austin, TX (US); Keith D. Moore, Cedar Park, TX (US); Gavin Sellers, Austin, TX (US)

(73) Assignee: SPARKCOGNITION, INC., Austin, TX (US)

( * ) Notice: Subject to any disclaimer, the term of this patent is extended or adjusted under 35 U.S.C. 154(b) by 918 days.

(21) Appl. No.: 16/848,007

(22) Filed: Apr. 14, 2020

(65) Prior Publication Data
US 2020/0242480 A1    Jul. 30, 2020

Related U.S. Application Data

(63) Continuation of application No. 16/205,088, filed on Nov. 29, 2018, now Pat. No. 10,657,447.

(51) Int. Cl.
*G06N 3/08* (2023.01)
*G06N 3/04* (2023.01)
(Continued)

(52) U.S. Cl.
CPC .............. *G06N 3/086* (2013.01); *G06N 3/04* (2013.01); *G06N 3/044* (2023.01)

(58) Field of Classification Search
None
See application file for complete search history.

(56) References Cited

U.S. PATENT DOCUMENTS

| 7,711,662 B2 | 5/2010 | Buscema | |
| 10,410,114 B2 * | 9/2019 | Kang | .................... G06N 3/045 |
| (Continued) | | | |

OTHER PUBLICATIONS

Bennani-Smires, Kamil et al., "GitGraph—Architecture Search Space Creating through Frequent Computational Subgraph Mining," arxiv.org, 1801.051595v1, Cornell University Library, 201 Olin Library Cornell University Ithaca, Ny 14853, Jan. 16, 2018, pp. 1-11.

(Continued)

*Primary Examiner* — Alan Chen
(74) *Attorney, Agent, or Firm* — Moore IP Law

(57) ABSTRACT

A method includes receiving, by a processor, an input data set. The input data set includes a plurality of features. The method includes determining, by the processor, one or more characteristics of the input data set. The method includes, based on the one or more characteristics, adjusting, by the processor, one or more architectural parameters of an automated model generation process. The automated model generation process is configured to generate a plurality of models using a weighted randomization process. The one or more architectural parameters weight the weighted randomization process to adjust a probability of generation of models having particular architectural features. The method further includes executing, by the processor, the automated model generation process to output a mode, the model including data representative of a neural network.

28 Claims, 5 Drawing Sheets

(51) Int. Cl.
G06N 3/044 (2023.01)
G06N 3/086 (2023.01)

(56) References Cited

U.S. PATENT DOCUMENTS

| | | | |
|---|---|---|---|
| 2016/0364522 | A1 | 12/2016 | Frey et al. |
| 2017/0185904 | A1* | 6/2017 | Padmanabhan .......... G06N 5/04 |
| 2017/0262737 | A1* | 9/2017 | Rabinovich ....... G06F 18/24137 |
| 2018/0137424 | A1* | 5/2018 | Gabaldon Royval .. G06N 5/022 |
| 2019/0114511 | A1 | 4/2019 | Gao et al. |
| 2019/0156178 | A1 | 5/2019 | Thornton et al. |
| 2019/0188567 | A1* | 6/2019 | Yao ........................ G06N 3/082 |

OTHER PUBLICATIONS

Cheng, Zhi-Qi, et al., "Learning to Transfer: Generalizable Attribute Learning with Mulitask Neural Model Search ACM Format Reference," 2018 ACM Multimedia Conference (MM '18), Oct. 22, 2018, pp. 90-98.

Extended European Search Report for Application No. 19889005.5 dated Sep. 20, 2022, 10 pgs.

Jung, Jae-Yoon, et al., "Evolutionary Design of Neural Network Architectures Using a Descriptive Encoding Language," IEEE Transactions on Evolutionary Computation, IEEE Service Center, New York, NY, US, vol. 10, No. 6, Dec. 2006, pp. 676-688.

Assuncao, F., et al., "DENSER: Deep Evolutionary Network Structured Representation", Genetic Programming and Evolvable Machines 2018, 11 pages.

International Search Report and Written Opinion for Application No. PCT/US2019/063696 dated Jan. 3, 2020, 8 pgs.

Liu, H., et al., "DARTS: Differentiable Architecture Search", ICLR 2019, 13 pages.

Pham, H., et al., "Efficient Neural Architecture Search via Parameter Sharing", Proceeding of the 35th International :; onference on Machine Learning, PMLR 80:4095-4104, 2018, 11 pages.

Stanley, K., et al., "Evolving Neural Networks through Augmenting Topologies", Evolutionary Computation 10(2): ?9-127, Massachusetts Institute of Technology, 2002, 30 pages.

Zoph, B., et al., "Neural Architecture Search with Reinforcement Learning", ICLR, 2017, pp. 1-16.

* cited by examiner

300

N -> MODULE  
MODULE -> MODULE MODULE  
MODULE -> LINEAR  
MODULE -> LSTM  
LINEAR -> SIZE ACT  
LSTM -> LAYERS SIZE  
⎫ ⎬ ⎭ ⎯ 302 Production Rules SIZE -> \<number\>  
LAYERS -> \<number\>  
ACT -> \<activation type\>  
\<number\> := 1 | 2 | ... m  
\<activation type\> := relu | identity | gauss | sigmoid  ⎫ ⎬ ⎭ ⎯ 304 Terminal Symbols

*FIG. 3*

AUTOMATED MODEL BUILDING SEARCH SPACE REDUCTION

CROSS-REFERENCE TO RELATED APPLICATIONS

The present application claims priority to and is a continuation of U.S. patent application Ser. No. 16/205,088 entitled "AUTOMATED MODEL BUILDING SEARCH SPACE REDUCTION," filed Nov. 29, 2018, and issued as U.S. Pat. No. 10,657,447, the contents of which are incorporated herein by reference in their entirety.

BACKGROUND

Computers are often used to solve complex quantitative and qualitative problems. For certain types of problems, advanced computing techniques, such as genetic algorithms, may be available to develop a model, such as a neural network, that is used to solve the problem. However, genetic algorithms may take a large number of iterations to converge on an acceptable neural network.

Furthermore, various types of machine-learning problems exist. For example, regression problems involve evaluating a series of inputs to predict a numeric output, classification problems involve evaluating a series of inputs to predict a categorical output, and reinforcement learning involves performing actions within an environment while learning from feedback from the actions. Due to the differences in the various types of problems, the available mechanisms to generate and train a neural network may be problem-specific. For example, a method of generating and training a neural network to solve a regression problem may be significantly less efficient for generating and training a neural network to solve a classification problem

SUMMARY

The present disclosure describes systems and methods for efficiently generating neural networks for different types of problems by automatically adjusting architectural parameters of an automated model building process. The architectural parameters are automatically adjusted based on characteristics of an input data set. Adjusting the architectural parameters operates to reduce the search space for a reliable neural network to solve a given problem. For example, parameters of an automatic model generation process, such as a genetic algorithm, may be biased to increase the probability that certain types of neural networks are used during evolution (e.g., as part of an initial set of models or a set of models generated during a later epoch). Thus, adjusting the architectural parameters based on characteristics of the input data set can result in the automated model building process focusing on types of neural networks that are particularly suited to processing the input data set, which can reduce the amount of time and processing resources used by the automated model building process to converge on an acceptable neural network (e.g., a neural network that satisfies a fitness or other criteria).

To illustrate, an input data set is analyzed to determine characteristics of the input data set. The characteristics may indicate a data type of the input data set, a problem to be solved by the input data set, etc. For example, if the input data set includes industrial time-series data, the characteristics may indicate that the input data set is timestamped and sequential and that the input data set includes continuous values (as compared to categorical values). Based on the characteristics of the input data set, one or more parameters of an automated model generation process are selected for adjustment. In a particular implementation, the characteristics are compared to a set of rules that maps characteristics of data sets to neural network grammars. As used herein, a neural network grammar is a list of rules that specify a topology or an architecture of a neural network. Based on the grammars that are associated with the characteristics in the set of rules, one or more architectural parameters are selected. In this implementation, the set of rules may be generated based on analysis of a plurality (e.g., hundreds or thousands) of previously generated neural networks. In an alternate implementation, a classifier is generated and trained using data representative of previously generated neural networks and the classifier is configured to output a neural network grammar based on the characteristics of the input data.

After selecting the one or more architectural parameters, the one or more architectural parameters are adjusted to weight a randomization process (e.g., a genetic algorithm) to adjust a probability of generation of models (e.g., neural networks) having particular architectural features. For example, if the characteristics of the input data file are associated with recurrent structures, either in the set of rules or by the trained classifier, an architectural parameter corresponding to recurrent structures (e.g., recurrent neural networks (RNNs), long short-term memory (LSTM) layers, gated recurrent unit (GRU) layers, as non-limiting examples) is adjusted to increase the likelihood that neural networks having recurrent structures are included in the randomization process. To further illustrate, a weight associated with recurrent structures may be increased, which increases the likelihood that neural networks having recurrent structures (as opposed to other randomly selected neural networks) are included in the randomization process. As another example, if the set of rules (or the trained classifier) indicates that feedforward layers have a negative correspondence to the characteristics of the input data set, an architectural parameter corresponding to feedforward layers is adjusted to decrease the likelihood that neural networks having feedforward layers are included in the randomization process. Thus, a randomization process can be weighted (through adjustment of the architectural parameters) to focus the randomization process on particular types of neural networks that are expected to perform well given the characteristics of the input data set, which can increase the speed and reduce the amount of processing resources used by the automated model generation process in converging on an acceptable neural network.

BRIEF DESCRIPTION OF THE DRAWINGS

FIG. 3 illustrates an example of a grammar that indicates architectural parameters of a neural network;

DETAILED DESCRIPTION

Figure 1:
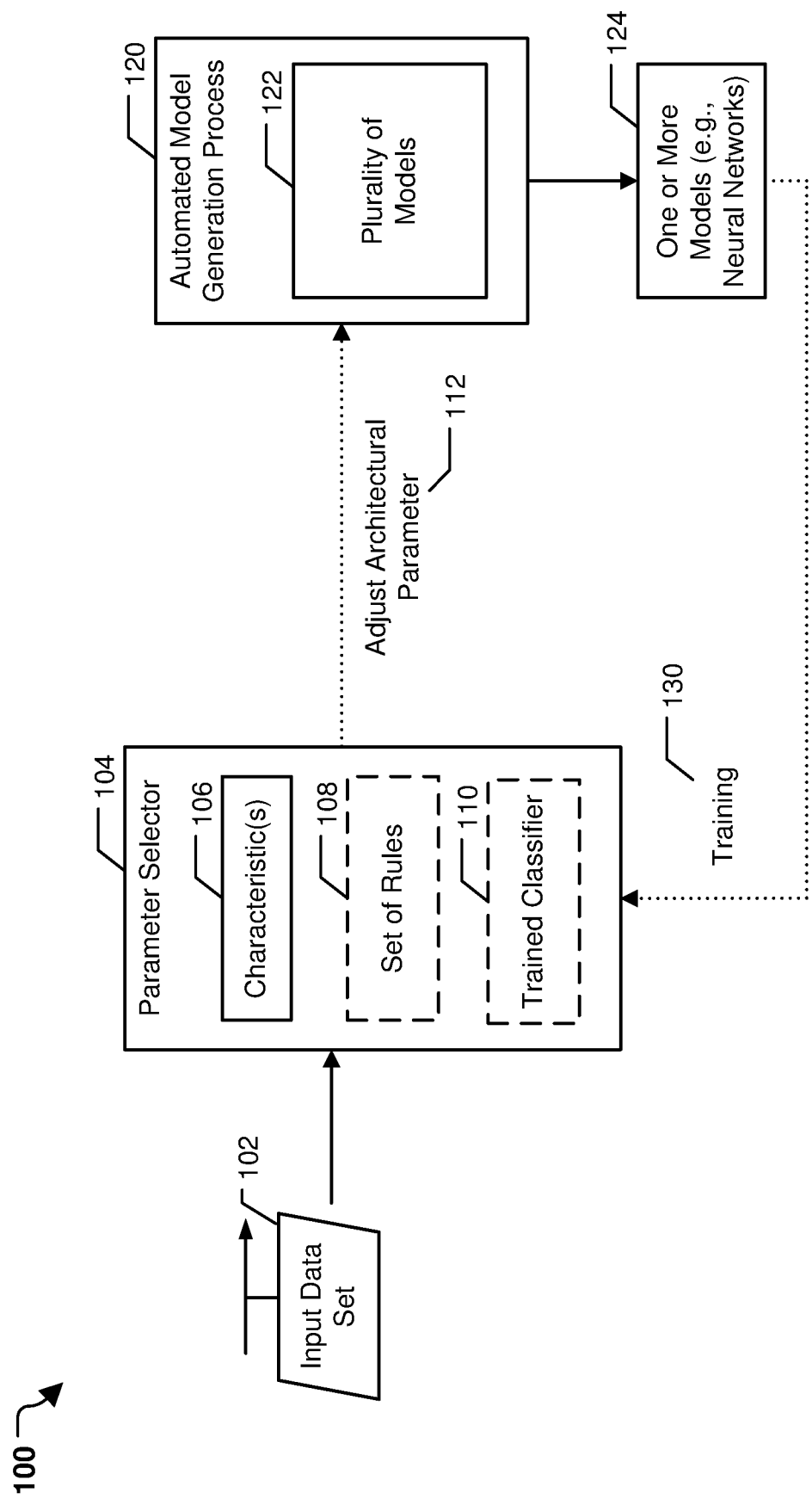
FIG. 1 illustrates a particular implementation of a system that is operable to adjust an architectural parameter of an automated model generation process based on characteristics of an input data set.

Referring to FIG. 1, a particular illustrative example of a system 100 is shown. The system 100, or portions thereof, may be implemented using (e.g., executed by) one or more computing devices, such as laptop computers, desktop computers, mobile devices, servers, and Internet of Things devices and other devices utilizing embedded processors and firmware or operating systems, etc. In the illustrated example, the system 100 includes a parameter selector 104 and an automated model generation process 120.

It is to be understood that operations described herein as being performed by the parameter selector 104 and the automated model generation process 120 may be performed by a device executing instructions. The instructions may be stored at a memory, such as a random-access memory (RAM), a read-only memory (ROM), a computer-readable storage device, an enterprise storage device, any other type of memory, or a combination thereof. In a particular implementation, the operations described with reference to the parameter selector 104 and the automated model generation process 120 are performed by a processor (e.g., a central processing unit (CPU), graphics processing unit (GPU), or other type of processor). In some implementations, the operations of the parameter selector 104 are performed on a different device, processor (e.g., CPU, GPU, or other type of processor), processor core, and/or thread (e.g., hardware or software thread) than the automated model generation process 120. Moreover, execution of certain operations of the parameter selector 104 or the automated model generation process 120 may be parallelized.

The parameter selector 104 is configured to receive an input data set 102 and to determine one or more characteristics 106 of the input data set 102. The characteristics 106 may indicate a data type of the input data set 102, a problem to be solved for the input data set 102, a size of the input data set 102, other characteristics associated with the input data set 102, or a combination thereof. The parameter selector 104 is further configured to adjust an architectural parameter 112 of the automated model generation process 120 based on the characteristics 106. In a particular implementation, the parameter selector 104 is configured to select the architectural parameter 112 using a set of rules 108, as further described herein. In another particular implementation, the parameter selector 104 is configured to select the architectural parameter 112 using a trained classifier 110, as further described herein.

The automated model generation process 120 is configured to generate a plurality of models 122 using a weighted randomization process. In a particular implementation, the automated model generation process 120 includes a genetic algorithm. In this implementation, the plurality of models 122 includes one or more sets of models generated during one or more epochs of the genetic algorithm. For example, the plurality of models 122 may include a set of initial models used as input to a first epoch of the genetic algorithm, a set of models output by the first epoch and used as input to a second epoch of the genetic algorithm, and other sets of models output by other epochs of the genetic algorithm. The automated model generation process 120 is configured to generate sets of models during each epoch using the weighted randomization process. For example, if all the weights of the architectural parameters are the same, the automated model generation process 120 generates an initial set of models by randomly (or pseudo-randomly) selecting models having various architectures, and the initial set of models are evolved across multiple epochs, as further described with reference to FIG. 4. As a particular example, one or more models may be mutated or crossed-over (e.g., combined) during a first epoch, as further described with reference to FIG. 4, to generate models of an output set of the first epoch. The output set is used as an input set to a next epoch of the automated model generation process 120. Additional epochs continue in this manner, by evolving (e.g., performing genetic operations on) an input set of models to generate an output set of models, as further described with reference to FIG. 4.

The architectural parameter 112 weights the weighted randomization process of the automated model generation process 120 to control a probability of generation of models having particular architectural features. For example, if the architectural parameter 112 corresponds to recurrency, the architectural parameter 112 can be adjusted (e.g., by increasing a weight) to increase a probability of generation of recurrent models by the weighted randomization process. As another example, if the architectural parameter 112 corresponds to pooling, the architectural parameter 112 can be adjusted (e.g., by decreasing a weight) to decrease the probability of generation of pooling-based models by the weighted randomization process. The architectural parameter 112 is adjusted based on the characteristics 106, as further described herein.

The automated model generation process 120 is configured to generate the plurality of models 122 during performance of the automated model generation process 120 (e.g., during multiple epochs of the genetic algorithm). The automated model generation process 120 is further configured to output one or more models 124 (e.g., data indicative of one or more neural networks). In a particular implementation, the automated model generation process 120 is configured to execute for a set amount of time (e.g., a particular number of epochs), and the one or more models 124 are the "fittest" models generated during the last epoch of the automated model generation process 120. Alternatively, the automated model generation process 120 may be executed until the automated model generation process 120 converges on one or more models having fitness scores that satisfy a fitness threshold. The fitness scores may be based on a frequency and/or a magnitude of errors produced by testing the one or more models 124 on a portion on the input data set 102. For example, if the one or more models 124 are trained, based on the input data set 102 to predict a value of a particular feature, the fitness score may be based on the number of correctly predicted features for a testing portion of the input data set 102 compared to the total number of features (both correctly and incorrectly predicted). Additionally, or alternatively, the fitness score may indicate characteristics of the model, such as a density (e.g., how many layers are included in the neural network, how many connections are included in the neural network, etc.) of the model. Additionally, or alternatively, the fitness score may be based on the amount of time taken by the automated model generation process 120 to converge on the one or more models 124. Data indicative of the one or more models 124, such as data indicating an architecture type of the one or more models 124, the fitness score, or a combination thereof, can be used as training data 130 to train the parameter selector 104.

The execution of the automated model generation process 120 results in (e.g., outputs) the one or more models 124. The one or more models 124 are executable by the processor that executes the automated model generation process 120

(or by another processor or by another device) to perform an operation, such as classification, clustering, anomaly detection, or some other type of operation based on input data. Stated another way, the automated model generation process 120 uses an unknown data set (e.g., the input data set 102) to generate software (e.g., the one or more models 124) that is configured to perform one or more operations based on related data sets. As a particular non-limiting example, if the input data set 102 includes time-series data from a sensor of a device, the automated model generation process 120 may be executed to train a neural network that can be executed by a processor to perform anomaly detection based on real-time (or near real-time) time-series data from the sensor. In this example, the one or more models 124 can be used to predict when a fault is likely to occur at the device, which can be used to repair the device before damage occurs or to apply shorter pre-emptive repairs instead of waiting for the device to fail. Because the automated model generation process 120 is biased to include models having particular architectural types (or to exclude models having particular architectural types), the one or more models 124 may be generated faster than compared to a model generation process that randomly selects models for use during the model generation process. Additionally, the one or more models 124 may have a higher fitness score than models that are generated using other model generation techniques.

During operation, the parameter selector 104 receives the input data set 102. The input data set 102 includes a plurality of features. The input data set 102 may include input data (e.g., features) for which one or more neural networks are to be trained to solve a problem. For example, the input data set 102 may include image data of handwritten digits, and the input data set 102 may be used to determine which digit (e.g., 0-9) is shown in each image, as a non-limiting example. In other examples, the input data set 102 includes other types of data that is to be used to solve other types of problems.

The parameter selector 104 determines the characteristics 106 based on the input data set 102. In a particular implementation, the characteristics 106 indicate a type of problem associated with the input data set, a data type associated with the input data set, or a combination thereof. To illustrate, in a particular example, the input data set 102 includes industrial time-series data. In this example, the characteristics 106 include that the input data set 102 is time-stamped and sequential, and that the input data set 102 includes continuous features (e.g., numerical features). As another example, the input data set 102 includes data for a classification task. In this example, the characteristics 106 include that the data includes one or more categorical features and that the data is indicated for classification. As yet another example, if the input data set 102 includes image data, the characteristics 106 indicate that a data type of the input data set 102 includes image data.

The parameter selector 104 adjusts the architectural parameter 112 based on the characteristics 106. For example, the characteristics 106 may correspond to one or more types of architectures of neural networks, and the parameter selector 104 may select and adjust the architectural parameter 112 to weight the weighted randomization process of the automated model generation process 120 to adjust a probability of generation of models having the one or more types of architectures.

In a particular implementation, the parameter selector 104 selects the architectural parameter 112 using the set of rules 108. For example, the parameter selector 104 may store or have access to the set of rules 108. In this implementation, the set of rules 108 maps characteristics of data sets to architectural parameters. For example, the set of rules 108 may map characteristics of data sets to grammars that indicate architectural parameters of neural networks. As a particular example, the set of rules 108 may map characteristics of standard (or "flat") supervised problems to architectural parameters corresponding to densely connected feedforward layers. As another example, the set of rules 108 may map characteristics of sequence problems to recurrent structures (such as recurrent neural networks (RNNs), long short-term memory (LSTM) layers, or gated recurrent units (GRU) layers, as non-limiting examples). As another example, the set of rules 108 may map characteristics of image problems (e.g., input image data) to pooling-based 2D convolutional neural networks. As another example, the set of rules 108 may map characteristics of industrial time series data to daisy chains of causal convolutional blocks. In a particular implementation, the set of rules 108 is based on analysis of a plurality of models that were previously generated by the automated model generation process 120, based on analysis of other models, or a combination thereof.

In a particular implementation, the set of rules 108 includes weight values. For example, a first rule may map a first characteristic to a first architectural parameter with a first weight value, and a second rule may map the first characteristic to a second architectural parameter with a second weight value. For example, time series data may be mapped to daisy chains of causal convolutional weight values with a first weight value, and time series data may be mapped to recurrent structures with a second weight value. The weight value indicates how much the parameter selector 104 will adjust the architectural parameter. For example, if the second weight value is less than the first weight value, the parameter adjuster will adjust architectural parameters such that the probability of models having daisy chains of causal convolution blocks is greater than the probability of models having recurrent structures. In some implementations, the weight may be negative. For negative weights, the parameter selector 104 may adjust the architectural parameter 112 to reduce the probability that models have the particular architectural feature.

In another particular implementation, the parameter selector 104 selects the architectural parameter 112 using the trained classifier 110. To illustrate, the parameter selector 104 provides data indicative of the characteristics 106 to the trained classifier 110, and the trained classifier 110 identifies one or more architectural parameters for adjustment based on the data indicative of the characteristics 106. The trained classifier 110 may be trained based on data indicative of previous models generated by the automated model generation process 120 (e.g., data indicative of architectural types of the previous models) and data indicative of characteristics of the input data used to train the previous models. For example, characteristics of input data may be labeled with an architectural parameter corresponding to the model generated for the input data, and this labeled data may be used as supervised training data to train the trained classifier 110 to identify architectural parameters based on characteristics of input data. In a particular implementation, the trained classifier 110 includes a neural network classifier. In other implementations, the trained classifier 110 includes a decision tree classifier, a support vector machine classifier, a regression classifier, a naive Bayes classifier, a perceptron classifier, or another type of classifier.

After selecting the architectural parameter 112, the parameter selector 104 adjusts the architectural parameter 112 to adjust a probability of generation of models (by the automated model generation process 120) having particular architectural features. In a particular implementation, the architectural feature includes an initial model type used by the weighted randomization process of the automated model generation process 120. The initial model type may include feedforward models, recurrent models, pooling-based two-dimensional convolutional models, daisy-chains of causal convolutional models, other types of models, or a combination thereof. To illustrate, the parameter selector 104 may set the architectural parameter 112 to a first value based on the characteristics 106, the first architectural parameter associated with a probability that models of a first epoch of the weighted randomization process have a first model type, and the parameter selector 104 may set a second architectural parameter to a second value based on the characteristics 106, the second architectural parameter associated with a probability that models of the first epoch of the weighted randomization process have a second model type.

As an example, the characteristics 106 may indicate that the input data set 102 includes image data. In this example, the set of rules 108 (or the trained classifier 110) indicate that pooling-based 2D convolutional neural networks have a positive correspondence with image data and that densely connected feedforward layers have a negative correspondence with image data. Based on the characteristics 106, the parameter selector 104 selects the architectural parameter 112 (corresponding to pooling-based 2D convolutional neural networks) and a second architectural parameter (corresponding to densely connected feedforward layers) for adjustment. In this example, the parameter selector 104 adjusts the architectural parameter 112 to increase the probability that the plurality of models 122 include pooling-based 2D convolutional neural networks. In this example, the parameter selector 104 also adjusts the second architectural parameter to decrease the probability that the plurality of models 122 include models having densely connected feedforward layers. Adjusting the architectural parameters in this manner may cause the automated model generation process 120 to converge faster on the one or more models 124 using fewer processing resources, because models that are more likely to be successful have a higher likelihood of being generated and used in the automated model generation process 120 (and models that are less likely to be successful have a lower likelihood of being generated).

The architectural parameter 112 may also include a mutation parameter. A mutation parameter controls mutation that occurs during the automated model generation process 120, such that at least one model of the plurality of models 122 is modified based on the mutation parameter. For example, mutation may occur to one or more models during an epoch of the automated model generation process 120. As further described with reference to FIG. 4, mutation includes changing at least one characteristic of the model. The mutation parameter indicates how likely mutation is to occur, what type of mutation is likely to occur (e.g., what characteristic is likely to change), or both. The mutation parameter may be adjusted based on the characteristics 106. For example, the set of rules 108 (or the trained classifier 110) may indicate an adjustment to a mutation parameter that corresponds to the characteristics 106, and the mutation parameter (e.g., the architectural parameter 112) may be adjusted accordingly.

In a particular implementation, the parameter selector 104 also selects and adjusts one or more training hyperparameters of the automated model generation process 120. The one or more training hyperparameters control one or more aspects of training of the model. As used herein, a hyperparameter refers to a characteristic that determines how a model is trained. For example, a hyperparameter may include a learning rate of a neural network (e.g., how quickly a neural network updates other parameters), momentum of a neural network, number of epochs of the automated model generation process 120, batch size, or a combination thereof. The parameter selector 104 may adjust the hyperparameter based on the characteristics 106. For example, the set of rules 108 (or the trained classifier 110) may indicate that a particular hyperparameter corresponds to the characteristics 106, and the parameter selector 104 may adjust the particular hyperparameter accordingly.

After the architectural parameter 112 is adjusted, the automated model generation process 120 is executed. For example, a processor executes the automated model generation process 120. During execution of the automated model generation process 120, the plurality of models 122 are generated. The plurality of models 122 are generated using a weighted randomization process, where architectural parameters control the weights. For example, if a particular architectural parameter has a higher weight than another architectural parameter, models having a particular architectural type have a higher probability of being included in an initial set (or other set) of models generated by the automated model generation process 120. The plurality of models 122 includes an initial set of models generated as input to an initial epoch as well as other sets of models generated as output sets of one or more epochs, as further described with reference to FIG. 4. The automated model generation process 120 may be executed until the automated model generation process 120 converges on the one or more models 124. As an example, the one or more models 124 may be the fittest model(s) of a last epoch of the automated model generation process 120. In a particular implementation, the number of epochs of the automated model generation process 120 is set prior to execution of the automated model generation process 120, and the one or more models 124 are taken from the output set of the last epoch. Alternatively, the automated model generation process 120 may be executed for a particular amount of time (e.g., until a time limit has expired). Alternatively, the automated model generation process 120 may be executed until at least one model of an output set has a score that satisfies a threshold (e.g., until the automated model generation process 120 converges on an acceptable model), and the one or more models 124 are the one or more models that satisfy the threshold. Thus, the one or more models 124 may be referred to as the output of the automated model generation process 120.

The one or more models 124 are trained to perform a task based on input data. As a particular example, the one or more models 124 may be trained based on the input data set 102 to perform a classification task. To further illustrate, the input data set 102 may include industrial time-series data indicative of various operating states of a device (e.g., industrial machinery, such as a wind turbine, a power plant, a generator, etc.), and the one or more models 124 may be trained to identify an operating state (or to predict a fault state) based on real-time time series input data. As another example, the one or more models 124 may be trained to perform clustering on credit card transactions to identify potentially fraudulent transactions. These examples are non-limiting, and in other implementations the one or more models 124 are trained to perform other machine learning tasks.

In some implementations, after the one or more models 124 are generated and trained, data indicative of the one or more models 124 is provided as the training data 130 to update the parameter selector 104. The training data 130 indicates characteristics, such as architecture types, of the one or more models 124. Updating the parameter selector 104 based on the training data 130 enables the parameter selector 104 to account for the success of the one or more models 124 generated by the automated model generation process 120.

In a particular implementation, the parameter selector 104 updates the set of rules 108 based on the training data 130 (e.g., based on the characteristics of the one or more models 124). In some implementations, the set of rules 108 are updated responsive to scores of the one or more models 124 satisfying a threshold. For example, if fitness scores of the one or more models 124 satisfy (e.g., are greater than or equal to) a first threshold, the set of rules 108 may be updated to indicate a correspondence between the characteristics 106 and architectural parameters indicating architectural types of the one or more models 124. If the set of rules 108 already indicate a correspondence between the characteristics 106 and the architectural parameters, a weighting associated with the architectural parameter may be increased. As another example, if fitness scores of the one or more models 124 fail to satisfy (e.g., are less than) a second threshold, the set of rules 108 may be updated to indicate a negative correspondence between the characteristics 106 and architectural parameters indicating architectural types of the one or more models 124. If the set of rules 108 already indicates a correspondence between the characteristics 106 and the architectural parameters, a weighting associated with the architectural parameters may be decreased. Thus, the set of rules 108 may be updated to account for the success (or lack thereof) of the one or more models 124.

In an alternate implementation, the parameter selector 104 uses the training data 130 as training data to retrain the trained classifier 110. For example, the training data 130 may include data corresponding to the characteristics 106 and a label indicating an architectural parameter corresponding to architectural types of the one or more models 124. In this example, the training data 130 is used as labeled training data to update the trained classifier 110. In a particular implementation, the trained classifier 110 is updated only if fitness scores of the one or more models 124 satisfy (e.g., are greater than or equal to) a first threshold. Additionally, or alternatively, an alternate label (e.g., indicating a negative correspondence) may be used if the fitness scores of the one or more models 124 fail to satisfy (e.g., are less than) a second threshold. Thus, the trained classifier 110 may be trained to account for the success (or lack thereof) of the one or more models 124.

The system 100 enables the automated model generation process 120 to converge on the one or more models 124 faster than other model generation processes. For example, the architectural parameter 112 may be adjusted based on the characteristics 106 to increase the probability that an initial set of models of the automated model generation process 120 includes models having architectural types that were previously successful for similar input data sets. These models may be fitter than other types of models at modeling the input data set 102. Increasing the probability that models having higher fitness are included in the initial set of models may decrease the number of epochs needed to converge on an acceptable neural network (e.g., the one or more models 124), thereby increasing speed of the automated model generation process 120 and decreasing the amount of processing resources utilized by the automated model generation process 120. Additionally, because fitter models are introduced in the initial set of models, the overall fitness of the one or more models 124 may be improved as compared to model generation processes that randomly determine the initial set of models. The architectural parameter 112 can be adjusted by an amount that still maintains some randomness in the selection of the initial input set in order to try models having different architectural parameters in case there is a type that has not yet been tried for the input data set 102 that performs better than those that have been previously tried. Adjusting a mutation parameter, or a hyperparameter, based on the characteristics 106 can similarly improve the speed of the automated model generation process 120 and reduce the amount of processing resources used by the automated model generation process 120.

It will be appreciated that the systems and methods of the present disclosure may be applicable in various scenarios, infrastructures, and data environments. As an illustrative non-limiting example, the input data set 102 may include timestamped data from a large array of sensors distributed around a wind farm and may also include timestamped uptime/downtime data of individual wind turbines. The system 100 may generate a neural network model that is configured to predict how likely a wind turbine is to fail. The neural network model may, in a particular example, increase failure lead time from 3-5 days to 30-40 days, which can result in reduced downtime and monetary savings for an operator of the wind farm. The system 100 may be capable of automatically building similar kinds of models that predict numerical values or states (e.g., failures) for internet of things (IoT), utilities, and oil/gas infrastructures.

As another illustrative non-limiting example, the input data set 102 may include health data and the system 100 may automatically build a model to predict whether a patient exhibiting certain health conditions is likely to have a particular ailment. As another illustrative non-limiting example, the input data set 102 may include financial data and the system 100 may automatically build a model to forecast market conditions. As another illustrative non-limiting example, the input data set 102 may include network security, network log, and/or malware data, and the system 100 may automatically build a model to implement firewall filtering rules, endpoint anti-malware detection, a bot/botnet detector, etc.

As another illustrative non-limiting example, the system 100 may generate a neural network to output aircraft auto-pilot operations (e.g. throttle, steer, flaps, etc.) based on reinforcement learning. In such an example, the reward function optimized by the neural network may involve aircraft altitude, aircraft distance traveled, etc. As yet another example, the system 100 may generate a neural network to predict oil/gas industry workover events (e.g., events that lead to major maintenance or remedial operations on a rig or well, which can lead to considerable production time lost and expense incurred).

Yet another example of a problem set that can be solved with neural networks generated with the system 100 described herein is data fusion. In this case, data aggregated from a large number of sensors of various types, including multiple sensors of the same type, is collected and used to identify an object, action or phenomenon that would not be entirely detectable with any one sensor or with a small subset of sensors. For example, the detection of a submarine may be performed based on the inputs received from multiple sonar buoys which provide input to the generated neural network. Another example may be the identification of a particular type of aircraft based on both the audio signature and a visual view (which may be partially obscured or have a low resolution).

Figure 2:
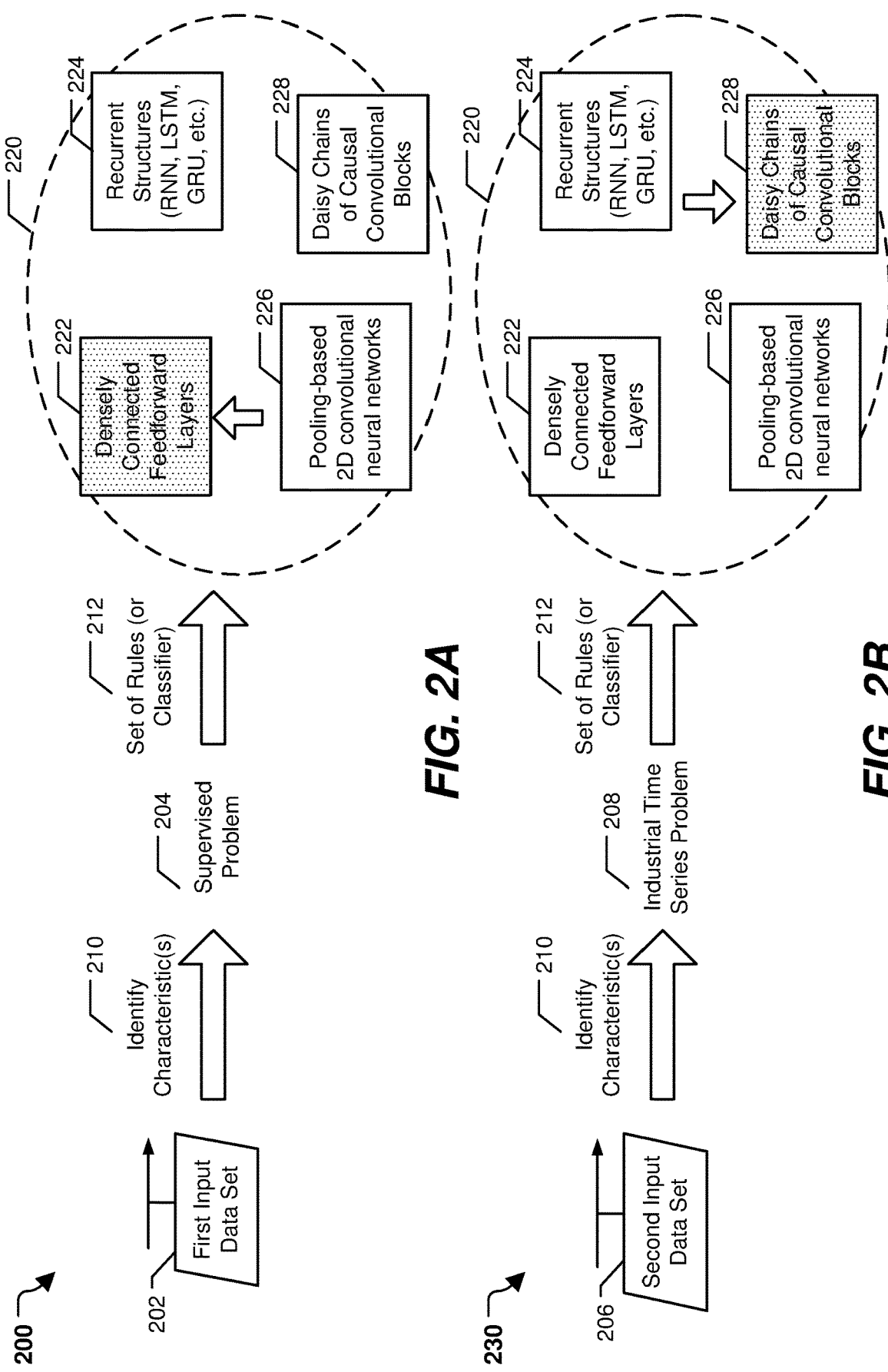
FIGS. 2A and 2B illustrate particular examples of selecting architectural parameters to adjust based on characteristics of input data in accordance with one or more aspects disclosed herein.

Referring to FIGS. 2A and 2B, particular examples of selecting architectural parameters to adjust based on characteristics of input data are shown. In a particular implementation, the architectural parameters are set by the parameter selector 104 of FIG. 1.

FIG. 2A illustrates a first example 200 of selecting architectural parameters to be adjusted based on characteristics of input data. In the first example 200, characteristics of a first input data set 202 are identified, at 210. For example, data types of the first input data set 202 may be identified, a type of problem corresponding to the first input data set 202 may be identified, timestamps may be identified, labels may be identified, other characteristics may be identified, or a combination thereof. The characteristics of the first input data set 202 may be identified by the parameter selector 104 of FIG. 1.

In the first example 200, the first input data set 202 corresponds to a standard (or "flat") supervised problem 204. For example, the first input data set 202 may include labeled data indicating that the problem associated with the first input data set 202 is the supervised problem 204. After identifying the characteristics of the first input data set 202 (e.g., the supervised problem 204), the characteristics are provided to a set of rules (or a trained classifier) at 212 to select an architectural parameter from the set of architectural parameters 220. The set of rules (or the trained classifier) may include or correspond to the set of rules 108 (or the trained classifier 110) of FIG. 1. The set of architectural parameters 220 may include a first architectural parameter 222 (corresponding to densely connected feedforward layers), a second architectural parameter 224 (corresponding to recurrent structures, such as RNNs, LSTM layers, GRUs, etc.), a third architectural parameter 226 (corresponding to pooling-based 2D convolutional neural networks), and a fourth architectural parameter 228 (corresponding to daisy chains of causal convolutional blocks).

Based on the set of rules (or the trained classifier), it is determined that densely connected feedforward layers are successful at modeling standard supervised problems. Thus, based on the characteristics of the first input data set 202, the first architectural parameter 222 is adjusted to increase the probability that an initial set of models used by a weighted randomization process (e.g., the automated model generation process 120 of FIG. 1) includes models having densely connected feedforward layers. This may improve the speed with which the weighted randomization process converges on an acceptable neural network (e.g., a neural network that satisfies a fitness or other criteria).

FIG. 2B illustrates a second example 230 of selecting architectural parameters to be adjusted based on characteristics of input data. In the second example 230, characteristics of a second input data set 206 are identified, at 210. For example, data types of the second input data set 206 may be identified, a type of problem corresponding to the second input data set 206 may be identified, timestamps may be identified, labels may be identified, other characteristics may be identified, or a combination thereof. The characteristics of the second input data set 206 may be identified by the parameter selector 104 of FIG. 1.

In the second example 230, the second input data set 206 corresponds to an industrial time-series problem 208. For example, the second input data set 206 may include time-stamped measurement data indicating that the problem associated with the second input data set 206 is the industrial time-series problem 208. After identifying the characteristics of the second input data set 206 (e.g., the industrial time-series problem 208), the characteristics are provided to a set of rules (or a trained classifier) at 212 to select an architectural parameter from the set of architectural parameters 220.

Based on the set of rules (or the trained classifier), it is determined that daisy chains of causal convolutional blocks are successful at modeling industrial time-series problems. Thus, based on the characteristics of the second input data set 206, the fourth architectural parameter 228 is adjusted to increase the probability that an initial set of models used by a weighted randomization process (e.g., the automated model generation process 120 of FIG. 1) includes models having daisy chains of causal convolutional blocks. This may improve the speed with which the weighted randomization process converges on an acceptable neural network (e.g., a neural network that satisfies a fitness or other criteria).

Referring to FIG. 3, a particular example of a grammar 300 that indicates architectural parameters for a neural network is shown. The grammar 300 indicates architectural parameter(s) that can be adjusted by the parameter selector 104 of FIG. 1. Because the grammar 300 indicates particular architectural parameters of neural networks, the grammar 300 can be referred to as defining a search space for a neural network architecture.

The grammar 300 includes production rules 302. The production rules 302 define which neural network substructures are allowed to evolve. In the particular example illustrated in FIG. 3, a neural network (N) includes two modules (MODULE). Any number of these residual blocks may be strung together to describe a topology or architecture of a neural network. Each module includes a linear layer, LSTM layers, or a combination thereof. The linear layer is defined by a particular size and an activation type. The LSTM layers are defined by a number of layers and a size.

In the particular example illustrated in FIG. 3, the size of a linear layer (or LSTM layers) is defined by a number, the number of layers (of the LSTM layers) is defined by a number, and the activation type is defined by a particular type of activation function. To illustrate, the numbers include integers from 1 to m, where m is a maximum number. M may be any maximum allowed size of a neural network layer. The activation types include a rectified linear unit (relu) function, an identity function, a gaussian function, or a sigmoid function. In other implementations, the activation types include other types of activation functions.

The grammar 300 further includes terminal symbols 304. The terminal symbols 304 include the elementary building blocks that are used to produce the neural network structures. In the particular example illustrated in FIG. 3, the terminal symbols 304 include the number and the activation type.

In the particular example illustrated in FIG. 3, the grammar 300 evolves RNNs and can be used for sequence problems. In other implementations, other grammars describe other neural network architectures, such as convolutional neural networks, densely connected feedforward layers, pooling-based 2D convolutional neural networks, daisy chains of causal convolutional blocks, other types of recurrent structures (e.g., GRUs), other types of neural networks, or a combination thereof. As described with reference to FIG. 1, architectural parameters associated with the grammar 300 (or other grammars) can be used to change the probability that models having particular types of architectures are generated by the automated model generation process 120, which can cause the automated model generation process 120 to converge faster on an acceptable model (e.g., a model that satisfies a fitness or other criteria).

Figure 4:
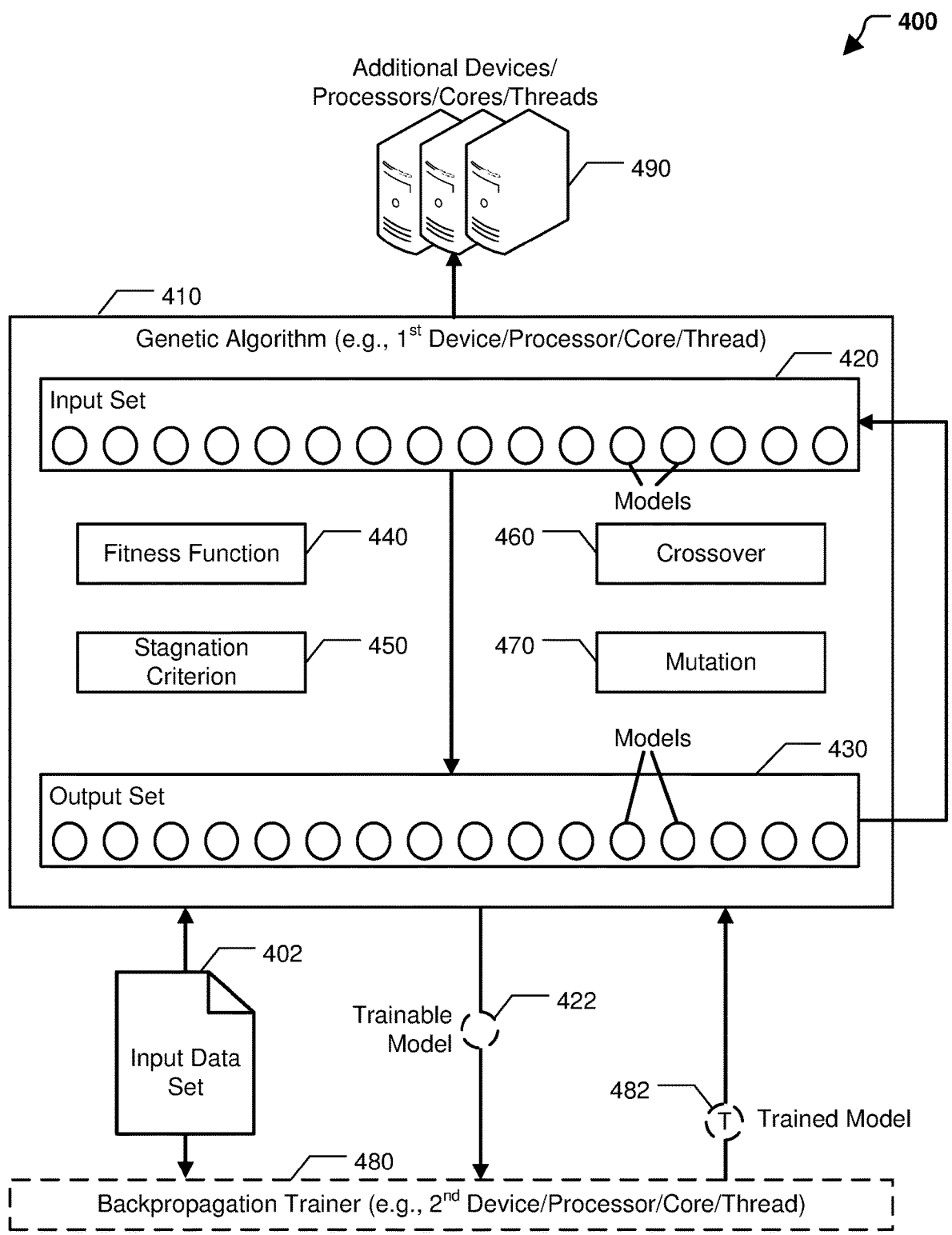
FIG. 4 is a diagram to illustrate a particular implementation of a system that is operable to determine a topology of a neural network, such as a neural network of FIG. 1, based on execution of a genetic algorithm.

Referring to FIG. 4, a particular implementation of a system 400 for determining a topology of a neural network is shown. In FIG. 4, a neural network topology may be "evolved" using a genetic algorithm 410. The genetic algorithm 410 automatically generates a neural network based on a particular data set, such as an illustrative input data set 402, and based on a recursive neuroevolutionary search process. In an illustrative example, the input data set 402 is the input data set 102 shown in FIG. 1. During each iteration of the search process (also called an "epoch" or "generation" of the genetic algorithm 410), an input set 420 (or population) is "evolved" to generate an output set 430 (or population). Each member of the input set 420 and the output set 430 is a model (e.g., a data structure) that represents a neural network. Thus, neural network topologies can be evolved using the genetic algorithm 410. The input set 420 of an initial epoch of the genetic algorithm 410 may be randomly or pseudo-randomly generated. In a particular implementation, the input set 420 of the initial epoch of the genetic algorithm 410 is generated based on one or more architectural parameters, which weight the selection of the input set 420 toward selection of particular neural network architectures, as described with reference to FIG. 1. After that, the output set 430 of one epoch may be the input set 420 of the next (non-initial) epoch, as further described herein.

The input set 420 and the output set 430 each includes a plurality of models, where each model includes data representative of a neural network. For example, each model may specify a neural network by at least a neural network topology, a series of activation functions, and connection weights. The topology of a neural network includes a configuration of nodes of the neural network and connections between such nodes. The models may also be specified to include other parameters, including but not limited to bias values/functions and aggregation functions.

In some examples, a model of a neural network is a data structure that includes node data and connection data. The node data for each node of a neural network may include at least one of an activation function, an aggregation function, or a bias (e.g., a constant bias value or a bias function). The activation function of a node may be a step function, sine function, continuous or piecewise linear function, sigmoid function, hyperbolic tangent function, or another type of mathematical function that represents a threshold at which the node is activated. The biological analog to activation of a node is the firing of a neuron. The aggregation function is a mathematical function that combines (e.g., sum, product, etc.) input signals to the node. An output of the aggregation function may be used as input to the activation function. The bias is a constant value or function that is used by the aggregation function and/or the activation function to make the node more or less likely to be activated. The connection data for each connection in a neural network includes at least one of a node pair or a connection weight. For example, if a neural network includes a connection from node N1 to node N2, then the connection data for that connection may include the node pair <N1, N2>. The connection weight is a numerical quantity that influences if and/or how the output of N1 is modified before being input at N2. In the example of a recurrent neural network, a node may have a connection to itself (e.g., the connection data may include the node pair <N1, N1>).

The genetic algorithm 410 includes or is otherwise associated with a fitness function 440, a stagnation criterion 450, a crossover operation 460, and a mutation operation 470. The fitness function 440 is an objective function that can be used to compare the models of the input set 420. In some examples, the fitness function 440 is based on a frequency and/or magnitude of errors produced by testing a model on the input data set 402. As a simple example, assume the input data set 402 includes ten rows, that the input data set 402 includes two columns denoted A and B, and that the models illustrated in FIG. 4 represent neural networks that output a predicted value of B given an input value of A. In this example, testing a model may include inputting each of the ten values of A from the input data set 402, comparing the predicted values of B to the corresponding actual values of B from the input data set 402, and determining if and/or by how much the two predicted and actual values of B differ. To illustrate, if a particular neural network correctly predicted the value of B for nine of the ten rows, then the a relatively simple fitness function 440 may assign the corresponding model a fitness value of 9/10=0.9. It is to be understood that the previous example is for illustration only and is not to be considered limiting. In some aspects, the fitness function 440 may be based on factors unrelated to error frequency or error rate, such as number of input nodes, node layers, hidden layers, connections, computational complexity, etc.

In a particular aspect, fitness evaluation of models may be performed in parallel. To illustrate, the illustrated system may include additional devices, processors, cores, and/or threads 490 to those that execute the genetic algorithm 410. These additional devices, processors, cores, and/or threads 490 may test model fitness in parallel based on the input data set 402 and may provide the resulting fitness values to the genetic algorithm 410.

In a particular aspect, the genetic algorithm 410 may be configured to perform speciation. For example, the genetic algorithm 410 may be configured to cluster the models of the input set 420 into species based on "genetic distance" between the models. Because each model represents a neural network, the genetic distance between two models may be based on differences in nodes, activation functions, aggregation functions, connections, connection weights, etc. of the two models. In an illustrative example, the genetic algorithm 410 may be configured to serialize a model into a string, such as a normalized vector. In this example, the genetic distance between models may be represented by a binned hamming distance between the normalized vectors, where each bin represents a subrange of possible values.

Because the genetic algorithm 410 is configured to mimic biological evolution and principles of natural selection, it may be possible for a species of models to become "extinct." The stagnation criterion 450 may be used to determine when a species should become extinct, as further described below. The crossover operation 460 and the mutation operation 470 may be highly stochastic under certain constraints and a defined set of probabilities optimized for model building, which may produce reproduction operations that can be used to generate the output set 430, or at least a portion thereof, from the input set 420. Crossover and mutation are further described below.

Operation of the illustrated system is now described. It is to be understood, however, that in alternative implementations certain operations may be performed in a different order than described. Moreover, operations described as sequential may be instead be performed at least partially concurrently, and operations described as being performed at least partially concurrently may instead be performed sequentially.

During a configuration stage of operation, a user may specify the input data set 402 or data sources from which the input data set 402 is determined. The user may also specify a goal for the genetic algorithm 410. For example, if the genetic algorithm 410 is being used to determine a topology of the one or more models 124, the user may provide one or more characteristics of the neural networks. The system 400 may then constrain models processed by the genetic algorithm 410 to those that have the one or more characteristics.

Thus, in particular implementations, the user can configure various aspects of the models that are to be generated/evolved by the genetic algorithm 410. Configuration input may indicate a particular data field of the data set that is to be included in the model or a particular data field of the data set that is to be omitted from the model, may constrain allowed model topologies (e.g., to include no more than a specified number of input nodes output nodes, no more than a specified number of hidden layers, no recurrent loops, etc.).

Further, in particular implementations, the user can configure aspects of the genetic algorithm 410, such as via input to graphical user interfaces (GUIs). For example, the user may provide input to limit a number of epochs that will be executed by the genetic algorithm 410. Alternatively, the user may specify a time limit indicating an amount of time that the genetic algorithm 410 has to execute before outputting a final output model, and the genetic algorithm 410 may determine a number of epochs that will be executed based on the specified time limit. To illustrate, an initial epoch of the genetic algorithm 410 may be timed (e.g., using a hardware or software timer at the computing device executing the genetic algorithm 410), and a total number of epochs that are to be executed within the specified time limit may be determined accordingly. As another example, the user may constrain a number of models evaluated in each epoch, for example by constraining the size of the input set 420 and/or the output set 430.

After configuration operations are performed, the genetic algorithm 410 may begin execution based on the input data set 402. Parameters of the genetic algorithm 410 may include but are not limited to, mutation parameter(s), a maximum number of epochs the genetic algorithm 410 will be executed, a threshold fitness value that results in termination of the genetic algorithm 410 even if the maximum number of generations has not been reached, whether parallelization of model testing or fitness evaluation is enabled, whether to evolve a feedforward or recurrent neural network, etc. As used herein, a "mutation parameter" affects the likelihood of a mutation operation occurring with respect to a candidate neural network, the extent of the mutation operation (e.g., how many bits, bytes, fields, characteristics, etc. change due to the mutation operation), and/or the type of the mutation operation (e.g., whether the mutation changes a node characteristic, a link characteristic, etc.). In some examples, the genetic algorithm 410 may utilize a single mutation parameter or set of mutation parameters for all models. In such examples, the mutation parameter may impact how often, how much, and/or what types of mutations can happen to any model of the genetic algorithm 410. In alternative examples, the genetic algorithm 410 maintains multiple mutation parameters or sets of mutation parameters, such as for individual or groups of models or species. In particular aspects, the mutation parameter(s) affect crossover and/or mutation operations, which are further described herein. In a particular implementation, the mutation parameter is adjusted by the system 400 based on characteristics of the input data set 402, as described with reference to FIG. 1.

The genetic algorithm 410 may automatically generate an initial set of models based on the input data set 402 and configuration input. Each model may be specified by at least a neural network topology, an activation function, and link weights. The neural network topology may indicate an arrangement of nodes (e.g., neurons). For example, the neural network topology may indicate a number of input nodes, a number of hidden layers, a number of nodes per hidden layer, and a number of output nodes. The neural network topology may also indicate the interconnections (e.g., axons or links) between nodes. In some aspects, layers nodes may be used instead of or in addition to single nodes. Examples of layer types include long short-term memory (LSTM) layers, gated recurrent units (GRU) layers, fully connected layers, and convolutional neural network (CNN) layers. In such examples, layer parameters may be involved instead of or in addition to node parameters.

The initial set of models may be input into an initial epoch of the genetic algorithm 410 as the input set 420, and at the end of the initial epoch, the output set 430 generated during the initial epoch may become the input set 420 of the next epoch of the genetic algorithm 410. In some examples, the input set 420 may have a specific number of models.

For the initial epoch of the genetic algorithm 410, the topologies of the models in the input set 420 may be randomly or pseudo-randomly generated within constraints specified by any previously input configuration settings or by one or more architectural parameters. Accordingly, the input set 420 may include models with multiple distinct topologies. For example, a first model may have a first topology, including a first number of input nodes associated with a first set of data parameters, a first number of hidden layers including a first number and arrangement of hidden nodes, one or more output nodes, and a first set of interconnections between the nodes. In this example, a second model of epoch may have a second topology, including a second number of input nodes associated with a second set of data parameters, a second number of hidden layers including a second number and arrangement of hidden nodes, one or more output nodes, and a second set of interconnections between the nodes. The first model and the second model may or may not have the same number of input nodes and/or output nodes.

The genetic algorithm 410 may automatically assign an activation function, an aggregation function, a bias, connection weights, etc. to each model of the input set 420 for the initial epoch. In some aspects, the connection weights are assigned randomly or pseudo-randomly. In some implementations, a single activation function is used for each node of a particular model. For example, a sigmoid function may be used as the activation function of each node of the particular model. The single activation function may be selected based on configuration data. For example, the configuration data may indicate that a hyperbolic tangent activation function is to be used or that a sigmoid activation function is to be used. Alternatively, the activation function may be randomly or pseudo-randomly selected from a set of allowed activation functions, and different nodes of a model may have different types of activation functions. In other implementations, the activation function assigned to each node may be randomly or pseudo-randomly selected (from the set of allowed activation functions) for each node the particular model. Aggregation functions may similarly be randomly or pseudo-randomly assigned for the models in the input set 420 of the initial epoch. Thus, the models of the input set 420 of the initial epoch may have different topologies (which may include different input nodes corresponding to different input data fields if the data set includes many data fields) and different connection weights. Further, the models of the input set 420 of the initial epoch may include nodes having different activation functions, aggregation functions, and/or bias values/functions.

Each model of the input set 420 may be tested based on the input data set 402 to determine model fitness. For example, the input data set 402 may be provided as input data to each model, which processes the input data set (according to the network topology, connection weights, activation function, etc., of the respective model) to generate output data. The output data of each model may be evaluated using the fitness function 440 to determine how well the model modeled the input data set 402 (i.e., how conducive each model is to clustering the input data). In some examples, fitness of a model based at least in part on reliability of the model, performance of the model, complexity (or sparsity) of the model, size of the latent space, or a combination thereof.

In some examples, the genetic algorithm 410 may employ speciation. In a particular aspect, a species ID of each of the models may be set to a value corresponding to the species that the model has been clustered into. Next, a species fitness may be determined for each of the species. The species fitness of a species may be a function of the fitness of one or more of the individual models in the species. As a simple illustrative example, the species fitness of a species may be the average of the fitness of the individual models in the species. As another example, the species fitness of a species may be equal to the fitness of the fittest or least fit individual model in the species. In alternative examples, other mathematical functions may be used to determine species fitness. The genetic algorithm 410 may maintain a data structure that tracks the fitness of each species across multiple epochs. Based on the species fitness, the genetic algorithm 410 may identify the "fittest" species, which may also be referred to as "elite species." Different numbers of elite species may be identified in different embodiments.

In a particular aspect, the genetic algorithm 410 uses species fitness to determine if a species has become stagnant and is therefore to become extinct. As an illustrative non-limiting example, the stagnation criterion 450 may indicate that a species has become stagnant if the fitness of that species remains within a particular range (e.g., +/−5%) for a particular number (e.g., 5) epochs. If a species satisfies a stagnation criterion, the species and all underlying models may be removed from the genetic algorithm 410.

The fittest models of each "elite species" may be identified. The fittest models overall may also be identified. An "overall elite" need not be an "elite member," e.g., may come from a non-elite species. Different numbers of "elite members" per species and "overall elites" may be identified in different embodiments.

The output set 430 of the epoch may be generated. In the illustrated example, the output set 430 includes the same number of models as the input set 420. The output set 430 may include each of the "overall elite" models and each of the "elite member" models. Propagating the "overall elite" and "elite member" models to the next epoch may preserve the "genetic traits" resulted in caused such models being assigned high fitness values.

The rest of the output set 430 may be filled out by random reproduction using the crossover operation 460 and/or the mutation operation 470. After the output set 430 is generated, the output set 430 may be provided as the input set 420 for the next epoch of the genetic algorithm 410.

During a crossover operation 460, a portion of one model is combined with a portion of another model, where the size of the respective portions may or may not be equal. When normalized vectors are used to represent neural networks, the crossover operation may include concatenating bits/bytes/fields 0 to p of one normalized vector with bits/bytes/fields p+1 to q of another normalized vectors, where p and q are integers and p+q is equal to the size of the normalized vectors. When decoded, the resulting normalized vector after the crossover operation produces a neural network that differs from each of its "parent" neural networks in terms of topology, activation function, aggregation function, bias value/function, link weight, or any combination thereof.

Thus, the crossover operation 460 may be a random or pseudo-random operator that generates a model of the output set 430 by combining aspects of a first model of the input set 420 with aspects of one or more other models of the input set 420. For example, the crossover operation 460 may retain a topology of hidden nodes of a first model of the input set 420 but connect input nodes of a second model of the input set to the hidden nodes. As another example, the crossover operation 460 may retain the topology of the first model of the input set 420 but use one or more activation functions of the second model of the input set 420. In some aspects, rather than operating on models of the input set 420, the crossover operation 460 may be performed on a model (or models) generated by mutation of one or more models of the input set 420. For example, the mutation operation 470 may be performed on a first model of the input set 420 to generate an intermediate model and the crossover operation may be performed to combine aspects of the intermediate model with aspects of a second model of the input set 420 to generate a model of the output set 430.

During the mutation operation 470, a portion of a model is randomly modified. The frequency, extent, and/or type of mutations may be based on the mutation parameter(s) described above, which may be user-defined, randomly selected/adjusted, or adjusted based on characteristics of the input set 420. When normalized vector representations are used, the mutation operation 470 may include randomly modifying the value of one or more bits/bytes/portions in a normalized vector.

The mutation operation 470 may thus be a random or pseudo-random operator that generates or contributes to a model of the output set 430 by mutating any aspect of a model of the input set 420. For example, the mutation operation 470 may cause the topology of a particular model of the input set to be modified by addition or omission of one or more input nodes, by addition or omission of one or more connections, by addition or omission of one or more hidden nodes, or a combination thereof. As another example, the mutation operation 470 may cause one or more activation functions, aggregation functions, bias values/functions, and/or or connection weights to be modified. In some aspects, rather than operating on a model of the input set, the mutation operation 470 may be performed on a model generated by the crossover operation 460. For example, the crossover operation 460 may combine aspects of two models of the input set 420 to generate an intermediate model and the mutation operation 470 may be performed on the intermediate model to generate a model of the output set 430.

The genetic algorithm 410 may continue in the manner described above through multiple epochs until a specified termination criterion, such as a time limit, a number of epochs, or a threshold fitness value (e.g., of an overall fittest model), is satisfied. When the termination criterion is satisfied, an overall fittest model of the last executed epoch may be selected and output as reflecting the topology of the one or more models 124 of FIG. 1. The aforementioned genetic algorithm-based procedure may be used to determine the topology of zero, one, or more than one neural network of the one or more models 124.

Figure 5:
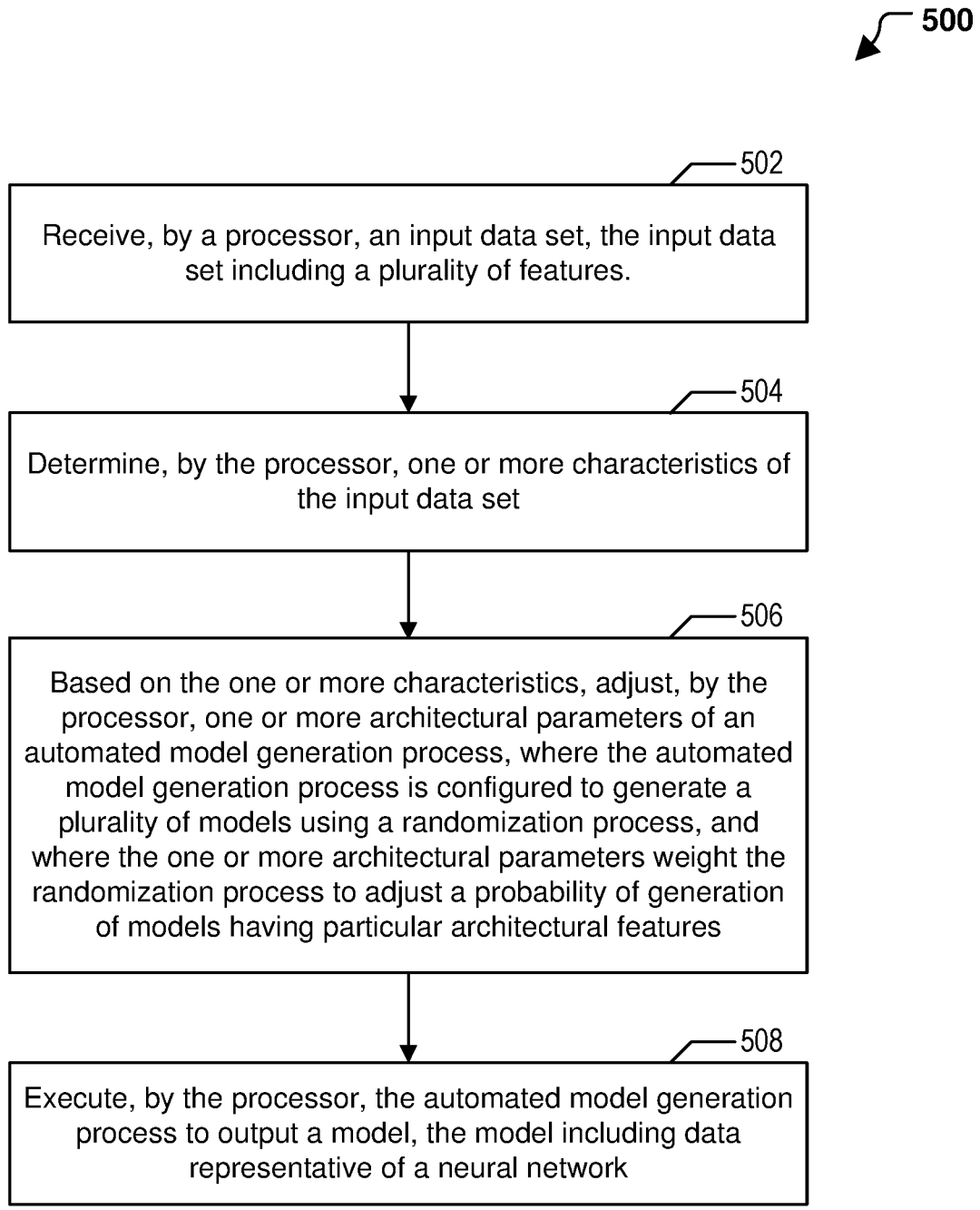
FIG. 5 is a flowchart to illustrate a particular implementation of a method of operation at the system of FIG. 1.

Referring to FIG. 5, a particular example of a method 500 of operation of the system 100 is shown. The method 500 includes receiving, by a processor, an input data set, at 502. The input data set includes a plurality of features. For example, the processor receives the input data set 102 of FIG. 1.

The method 500 includes determining, by the processor, one or more characteristics of the input data set, at 504. For example, the parameter selector 104 (e.g., the processor) determines the characteristics 106 of the input data set 102.

The method 500 includes, based on the one or more characteristics, adjusting, by the processor, one or more architectural parameters of an automated model generation process, at 506. The automated model generation process is configured to generate a plurality of models using a randomization process. The one or more architectural parameters weight the randomization process to adjust a probability of generation of models having particular architectural features. To illustrate, the parameter selector 104 adjusts the architectural parameter 112 to adjust a probability of the plurality of models 122 including models having architectural types that correspond to the architectural parameter 112.

The method 500 further includes executing, by the processor, the automated model generation process to output a model, at 508. The model includes data representative of a neural network. For example, the automated model generation process 120 is executed to generate and train the one or more models 124.

In a particular implementation, the particular architectural features include an initial model type used by the weighted randomization process. For example, the architectural parameter 112 may correspond to an initial model type included in the plurality of models 122 (e.g., in an initial set of models of an initial epoch). The initial model type may include feedforward models, recurrent models, pooling-based two-dimensional convolutional models, daisy-chains of causal convolutional models, other types of models, or a combination thereof.

In a particular implementation, the one or more characteristics indicate a type of problem associated with the input data set, a data type associated with the input data set, or a combination thereof. For example, the characteristics 106 may indicate that the input data set 102 includes image data (e.g., is associated with an image problem) or may indicate that the input data set 102 is associated with a classification problem (e.g., because the input data set includes labeled data).

In a particular implementation, the one or more architectural parameters include a mutation parameter, and at least one model of the plurality of models generated using the weighted randomization process is modified based on the mutation parameter. For example, the mutation operation 470 may be adjusted by the parameter selector 104 of FIG. 1 based on the characteristics 106.

In a particular implementation, the method 500 further includes, based on the one or more characteristics, adjusting, by the processor, one or more training hyperparameters of the automated model generation process. The one or more training hyperparameters control one or more aspects of training of the model. For example, a training hyperparameter, such as learning rate, can be adjusted based on the characteristics 106, similar to adjusting the architectural parameter 112.

In a particular implementation, adjusting the one or more architectural parameters includes setting a first architectural parameter to a first value based on the one or more characteristics and setting a second architectural parameter to a second value based on the one or more characteristics. The first architectural parameter is associated with a probability that models of a first epoch of the weighted randomization process have a first model type, and the second architectural parameter is associated with a probability that models of the first epoch of the weighted randomization process have a second type. For example, if the characteristics 106 have a positive correspondence to a first architectural parameter and a negative correspondence to a second architectural parameter, the first architectural parameter can be adjusted to increase the probability that models of an initial epoch have a first type and the second architectural parameter can be adjusted to decrease the probability that modes of the initial epoch have a second type.

In a particular implementation, adjusting the one or more architectural parameters based on the one or more characteristics includes comparing the one or more characteristics to a set of rules that maps data set characteristics to architectural parameters. The set of rules maps the data set to characteristics of grammars, and the grammars indicate corresponding architectural parameters. For example, the set of rules 108 maps characteristics of data sets to grammars, such as the grammar 300 of FIG. 3, that indicate particular architectural parameters. Additionally, the method 500 may include updating the set of rules based on characteristics of the model. For example, the set of rules 108 may be updated based on the training data 130 such that the set of rules 108 takes into account the success (or lack thereof) of the one or more models 124. In a particular implementation, the set of rules are updated responsive to a score of the model satisfying a threshold. For example, if fitness scores of the one or more models 124 satisfy a threshold, the set of rules 108 is updated based on the training data 130.

In a particular implementation, adjusting the one or more architectural parameters based on the one or more characteristics includes providing data indicative of the one or more characteristics to a particular neural network configured to identify one or more architectural parameters for adjustment based on the data indicative of the one or more characteristics. For example, the particular neural network may include or correspond to the trained classifier 110 of FIG. 1 that is configured to identify architectural parameter (s) based on characteristics of input sets of data. The method 500 may further include retraining the particular neural network based on training data. The training data indicates characteristics of the model. For example, data indicative of the one or more models 124 may be used as the training data 130 to further train the trained classifier 110.

In a particular implementation, executing the automated model generation process includes, based on a fitness function, selecting, by the processor, a subset of models from the plurality of models (the plurality of models based on a genetic algorithm and corresponding to a first epoch of the genetic algorithm), performing, by the processor, at least one genetic operation of the genetic algorithm with respect to at least one model of the subset to generate a trainable model, sending the trainable model to an optimization trainer, and adding a trained model received from the optimization trainer as an input to a second epoch of the genetic algorithm that is subsequent to the first epoch. For example, a subset of the input set 420 of FIG. 4 may be selected for performance of at least one genetic operation, such as the crossover operation 460 or the mutation operation 470, and at least one model (e.g., the trainable model 422) may be provided to the backpropagation trainer 480 for training into the trained model 482. The fitness function may be evaluated based on the input data set, and the optimization trainer may be configured to use a portion of the input data set to train the trainable model.

The method 500 enables generation and training of one or more models faster, and using fewer processing resources, than other model generation techniques. For example, by adjusting one or more architectural parameters to adjust the probability that models having certain types of architectures are included in an input set of an automated model generation process, the method 500 provides fitter models than would otherwise be included using a purely random process. Providing fitter models reduces the number of epochs used to converge on the one or more models, which increases the speed and decreases the processing resources used by the automated model generation process.

It is to be understood that the division and ordering of steps described herein shown in the flowchart of FIG. 5 is for illustrative purposes only and is not be considered limiting. In alternative implementations, certain steps may be combined and other steps may be subdivided into multiple steps. Moreover, the ordering of steps may change.

In conjunction with the described aspects, a method includes receiving, by a processor, an input data set. The input data set includes a plurality of features. The method includes determining, by the processor, one or more characteristics of the input data set. The method includes, based on the one or more characteristics, adjusting, by the processor, one or more architectural parameters of an automated model generation process. The automated model generation process is configured to generate a plurality of models using a weighted randomization process. The one or more architectural parameters weight the weighted randomization process to adjust a probability of generation of models having particular architectural features. The method further includes executing, by the processor, the automated model generation process to output a model. The model includes data representative of a neural network.

In conjunction with the described aspects, a computing device includes a processor and a memory storing instructions executable by the processor to perform operations including receiving an input data set. The input data set includes a plurality of features. The operations include determining one or more characteristics of the input data set. The operations include, based on the one or more characteristics, adjusting one or more architectural parameters of an automated model generation process. The automated model generation process is configured to generate a plurality of models using a weighted randomization process. The one or more architectural parameters weight the weighted randomization process to adjust a probability of generation of models having particular architectural features. The operations further include executing the automated model generation process to output a model. The model includes data representative of a neural network.

In a particular implementation, the particular architectural features include an initial model type used by the weighted randomization process, and the initial model type includes feedforward models, recurrent models, pooling-based two-dimensional convolutional models, daisy-chains of convolutional models, or a combination thereof. For example, the architectural parameter 112 may include an initial model type, and the initial model type may include feedforward models, recurrent models, pooling-based two-dimensional convolutional models, daisy-chains of convolutional models, or a combination thereof. Additionally, or alternatively, the one or more characteristics indicate a type of problem associated with the input data set, a data type associated with the input data set, or a combination thereof. For example, the characteristics 106 may indicate a type of problem associated with the input data set 102, a data type associated with the input data set 102, or a combination thereof.

In conjunction with the described aspects, a computer-readable storage device stores instructions that, when executed, cause a computer to perform operations including receiving an input data set. The input data set includes a plurality of features. The operations include determining one or more characteristics of the input data set. The operations include, based on the one or more characteristics, adjusting one or more architectural parameters of an automated model generation process. The automated model generation process is configured to generate a plurality of models using a weighted randomization process. The one or more architectural parameters weight the weighted randomization process to adjust a probability of generation of models having particular architectural features. The operations further include executing the automated model generation process to output a model. The model includes data representative of a neural network.

In a particular implementation, the operations further include setting a first architectural parameter to a first value based on the one or more characteristics. The first architectural parameter is associated with a probability that models of a first epoch of the weighted randomization process have a first model type. For example, the architectural parameter 112 can be set, based on the characteristics 106, to a value that increases (or decreases) a probability that models of a first epoch of the automated model generation process 120 have a first model type. Additionally, or alternatively, the operations further include updating a set of rules or a trained classifier based on a data set indicating a plurality of previously-generated models and characteristics of input data associated with the plurality of previously-generated models. The set of rules or the trained classifier is used to determine the one or more architectural parameters. For example, the set of rules 108 or the trained classifier 110 may be generated (and/or trained) based on data indicating a plurality of previously-generated models and characteristics of input data associated with the plurality of previously generated models.

The systems and methods illustrated herein may be described in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, AWK, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of techniques for data transmission, signaling, data processing, network control, and the like.

The systems and methods of the present disclosure may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based (e.g., cloud computing) embodiment, an entirely hardware embodiment, or an embodiment combining aspects of the internet, software and hardware. Furthermore, the system may take the form of a computer program product on a computer-readable storage medium or device having computer-readable program code (e.g., instructions) embodied or stored in the storage medium or device. Any suitable computer-readable storage medium or device may be utilized, including hard disks, CD-ROM, optical storage devices, magnetic storage devices, and/or other storage media. Thus, also not shown in FIG. 1, the system 100 may be implemented using one or more computer hardware devices (which may be communicably coupled via local and/or wide-area networks) that include one or more processors, where the processor(s) execute software instructions corresponding to the various components of FIG. 1. Alternatively, one or more of the components of FIG. 1 may be implemented using a hardware device, such as a field-programmable gate array (FPGA) device, an application-specific integrated circuit (ASIC) device, etc. As used herein, a "computer-readable storage medium" or "computer-readable storage device" is not a signal.

Systems and methods may be described herein with reference to screen shots, block diagrams and flowchart illustrations of methods, apparatuses (e.g., systems), and computer media according to various aspects. It will be understood that each functional block of a block diagrams and flowchart illustration, and combinations of functional blocks in block diagrams and flowchart illustrations, respectively, can be implemented by computer program instructions.

Computer program instructions may be loaded onto a computer or other programmable data processing apparatus to produce a machine, such that the instructions that execute on the computer or other programmable data processing apparatus create means for implementing the functions specified in the flowchart block or blocks. These computer program instructions may also be stored in a computer-readable memory or device that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

Although the disclosure may include a method, it is contemplated that it may be embodied as computer program instructions on a tangible computer-readable medium, such as a magnetic or optical memory or a magnetic or optical disk/disc. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Changes and modifications may be made to the disclosed embodiments without departing from the scope of the present disclosure. These and other changes or modifications are intended to be included within the scope of the present disclosure, as expressed in the following claims.

What is claimed is:

1. A method of neural network generation, the method comprising:
   determining, by a processor, one or more characteristics of an input data set;
   based on the one or more characteristics, setting, by the processor, one or more architectural parameters to constrain topologies of hidden layers used by an automated model generation process; and
   executing, by the processor, the automated model generation process to generate an initial set of models using a weighted randomization process based on the one or more architectural parameters, wherein the initial set of models comprises a model including data representative of a neural network.

2. The method of claim 1, wherein a value of an architectural parameter of the one or more architectural parameters is used as a weighting value for the weighted randomization process.

3. The method of claim 1, wherein probabilities of the weighted randomization process generating models having particular architectural features are determined based on weighting values associated with the particular architectural features.

4. The method of claim 1, wherein each model of the initial set of models has a hidden layer with an architectural feature selected based on the weighted randomization process.

5. The method of claim 1, wherein the one or more architectural parameters include a first architectural parameter associated with a probability that models of a first epoch of the weighted randomization process have a first model type.

6. The method of claim 1, wherein a value of an architectural parameter of the one or more architectural parameters is used as a weighting value for the weighted randomization process, and wherein the weighting value is associated with a probability of generating a feedforward model, a probability of generating a recurrent model, a probability of generating a pooling-based two-dimensional convolutional model, a probability of generating a daisy-chains of causal convolutional model, or a combination thereof.

7. The method of claim 1, further comprising, based on the one or more characteristics, adjusting, by the processor, one or more training hyperparameters of the automated model generation process, wherein the one or more training hyperparameters control one or more aspects of training of the model.

8. The method of claim 7, wherein the training hyperparameters include one or more of a learning rate of a neural network, a momentum of a neural network, a number of epochs of the automated model generation process, or a batch size.

9. The method of claim 1, wherein the one or more characteristics indicate a type of problem associated with the input data set, a data type associated with the input data set, or a combination thereof.

10. The method of claim 1, wherein setting the one or more architectural parameters comprises comparing the one or more characteristics to rules that map data set characteristics to model topology parameters.

11. The method of claim 10, further comprising, after the automated model generation process outputs the model:
determining whether a score of the model satisfies a threshold; and
responsive to determining that the score satisfies the threshold, updating one or more of the rules based on characteristics of the model.

12. The method of claim 1, wherein executing the automated model generation process comprises:
based on a fitness function, selecting, by the processor, a subset of models from the initial set of models, the initial set of models based on a genetic algorithm and corresponding to a first epoch of the genetic algorithm;
performing, by the processor, at least one genetic operation of the genetic algorithm with respect to at least one model of the subset to generate a trainable model;
sending the trainable model to an optimization trainer to modify link weights of the trainable model; and
adding a trained model received from the optimization trainer as input to a second epoch of the genetic algorithm that is subsequent to the first epoch.

13. The method of claim 12, wherein the fitness function is evaluated based on the input data set, and wherein the optimization trainer is configured to use a portion of the input data set to train the trainable model.

14. A computing device comprising:
one or more processors; and
a memory storing instructions executable by the one or more processors to perform operations comprising:
determining one or more characteristics of an input data set;
based on the one or more characteristics, setting one or more architectural parameters to constrain topologies of hidden layers used by an automated model generation process;
based on the one or more characteristics, adjusting one or more training hyperparameters of the automated model generation process; and
executing the automated model generation process to generate a plurality of models, wherein the plurality of models comprises a model including data representative of a neural network, and wherein the one or more training hyperparameters control one or more aspects of training of the model.

15. The computing device of claim 14, wherein the automated model generation process generates the plurality of models using a weighted randomization process that is based on the one or more architectural parameters, and wherein probabilities of the weighted randomization process generating models having particular architectural features are determined based on weighting values associated with the particular architectural features.

16. The computing device of claim 14, wherein executing the automated model generation process includes generating an initial set of models using a weighted randomization process based on the one or more architectural parameters.

17. The computing device of claim 16, wherein a weighting value of the weighted randomization process is associated with a probability of generating one or more of a feedforward model, a recurrent model, a pooling-based two-dimensional convolutional model, a daisy-chains of causal convolutional model, or a combination thereof.

18. The computing device of claim 14, wherein the one or more characteristics indicate a type of problem associated with the input data set, a data type associated with the input data set, or a combination thereof.

19. The computing device of claim 14, wherein setting the one or more architectural parameters comprises comparing the one or more characteristics to rules that map data set characteristics to model topology parameters.

20. The computing device of claim 19, wherein the operations further comprise updating the rules based on characteristics of the model responsive to determining that a score associated with the model satisfies a threshold.

21. A computer-readable storage device storing instructions that, when executed by a processor, cause the processor to perform operations comprising:
determining, by the processor, one or more characteristics of an input data set;
based on the one or more characteristics, setting, by the processor, one or more architectural parameters to constrain topologies of hidden layers used by an automated model generation process;
comparing the one or more characteristics to rules that map data set characteristics to model topology parameters;
executing, by the processor, the automated model generation process to generate a plurality of models, wherein the plurality of models comprises a model including data representative of a neural network; and
updating the rules based on characteristics of the model responsive to a determination that a score associated with the model satisfies a first threshold.

22. The computer-readable storage device of claim 21, wherein the automated model generation process generates the plurality of models using a weighted randomization process that is based on the one or more architectural parameters, and wherein probabilities of the weighted randomization process generating models having particular architectural features are determined based on weighting values associated with the particular architectural features.

23. The computer-readable storage device of claim 21, wherein executing the automated model generation process includes generating an initial set of models using a weighted randomization process based on the one or more architectural parameters.

24. The computer-readable storage device of claim 23, wherein a weighting value of the weighted randomization process is associated with a probability of generating one or more of a feedforward model, a recurrent model, a pooling-based two-dimensional convolutional model, a daisy-chains of causal convolutional model, or a combination thereof.

25. The computer-readable storage device of claim 21, wherein the operations further comprise, based on the one or more characteristics, adjusting one or more training hyperparameters of the automated model generation process, wherein the one or more training hyperparameters control one or more aspects of training of the model.

26. The computer-readable storage device of claim 21, wherein setting the one or more architectural parameters causes the plurality of models to include types of neural networks suited to processing the input data set.

27. The computer-readable storage device of claim 26, wherein the operations further comprise updating the rules based on characteristics of the model responsive to determining that the score associated with the model fails to satisfy a second threshold.

28. A method of neural network generation, the method comprising:
   determining, by a processor, one or more characteristics of an input data set;
   based on the one or more characteristics, setting, by the processor, one or more architectural parameters to constrain topologies of hidden layers used by an automated model generation process;
   executing, by the processor, the automated model generation process to generate a plurality of models, wherein the plurality of models comprises a model including data representative of a neural network;
   based on a fitness function, selecting, by the processor, a subset of models from the plurality of models, the plurality of models based on a genetic algorithm and corresponding to a first epoch of the genetic algorithm;
   performing, by the processor, at least one genetic operation of the genetic algorithm with respect to at least one model of the subset to generate a trainable model;
   sending the trainable model to an optimization trainer to modify link weights of the trainable model; and
   adding a trained model received from the optimization trainer as input to a second epoch of the genetic algorithm that is subsequent to the first epoch.

* * * * *